J. M. MAY.

Drill for Well-Boring.

No. 6,337. Reissued March 16, 1875.

ATTEST:

Robert Burns.
Henry Turner.

INVENTOR:

John M. May
By Knight Bros.
Attys.

UNITED STATES PATENT OFFICE.

JOHN M. MAY, OF CEDAR RAPIDS, IOWA, ASSIGNOR TO LOUIS M. RUMSEY AND MOSES RUMSEY, OF ST. LOUIS, MISSOURI.

IMPROVEMENT IN DRILLS FOR WELL-BORING.

Specification forming part of Letters Patent No. 49,129, dated August 1, 1865; reissue No. 6,337, dated March 16, 1875; application filed February 10, 1875.

*To all whom it may concern:*

Be it known that I, JOHN M. MAY, of Cedar Rapids, Linn county, State of Iowa, formerly of Rock county, State of Wisconsin, have invented a new and useful Improvement in a Combined Rock-Drill and Pump, forming a built tool that I call "a pump-drill;" and I do hereby declare that the following is a full and exact description thereof, reference being had to the accompanying drawings and to the letters of reference marked thereon.

The nature of my invention consists, first, in connecting a pump-drill, or a drill, to a rope or rod, used to operate a pump-drill, or a drill, by means of a swivel, so constructed that a single or a double blow may be given at each descending stroke of the drill, and allow the drill to revolve; second, a spring-guide, through which a pipe or rod used to operate a drill passes, to prevent friction of the pipe or rod against the sides of the drilled rock, and to keep the pipe or rod central in the drilled hole as the drill rises and falls, and so constructed as to catch pieces of rock, tools, and other substances that may drop into the drilled hole, and prevent their getting between the rock and the drill; third, a screen or strainer to keep the sand, pulverized pieces of rock, and coarse substances from entering and clogging the pump; fourth, in combining with a screen or strainer a guide-flange having perforations, to permit water to pass to wash the bit and keep clean the portion being drilled; fifth, in combining a screen or strainer with a bit.

In the accompanying drawings the same letter in each figure represents the same part.

Figure 1:
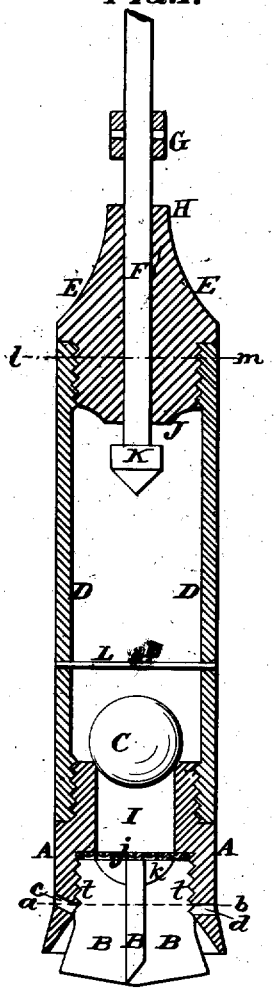
Figure 9:
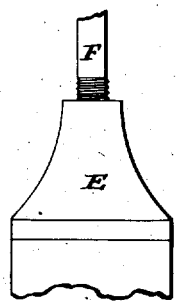
Figure 8:
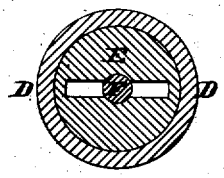
Figure 7:
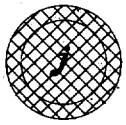
Figure 6:
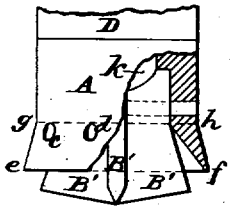
Figure 4:
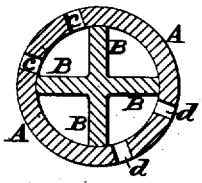
Figure 5:
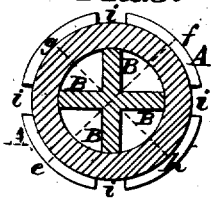
Figure 2:
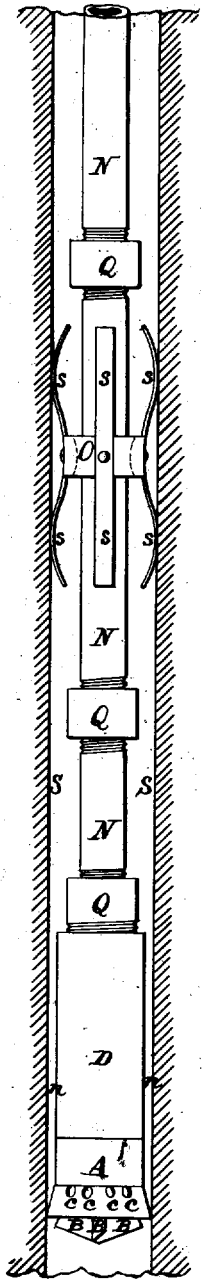
Figure 3:
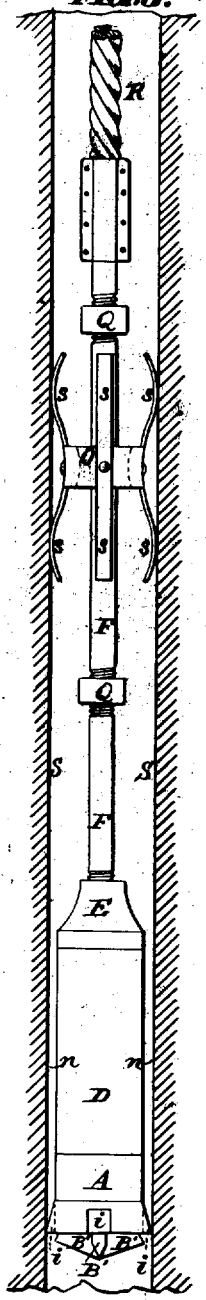

Figure 1 is a vertical section through the center of the pump-drill and swivel. Fig. 2 is a view of a pump-drill and pipe for operating the same, the pipe also serving to conduct the contents of the pump to the surface of the ground to be discharged, a spring-guide being used to keep the pipe central in the drilled hole. The pump-drill and pipe in this figure are represented as being inside a drilled hole or drilled well, the well part of this figure being a vertical section through its center. Fig. 3 is a similar view to Fig. 2, a rod and rope, instead of a pipe, being represented with which to operate the pump-drill. Fig. 4 is a horizontal cross-section from *a* to *b*, Fig. 1. Fig. 5 is a horizontal section, showing a circular cutting-edge of a drill from *e* to *f*, and the diameter of the drill from *g* to *h* in Fig. 6. Fig. 6 shows the lower end of a pump-drill put together, with a portion broken away, showing its interior. Fig 7 shows a screen or sieve, to protect the valve and pump from being obstructed, it being a horizontal view. Fig. 8 is a horizontal cross-section from *l* to *m* in Fig. 1, and Fig. 9 is the top of a pump-drill connected directly with a drilling-rod without a swivel.

A is the circular member of a pump-drill. To this member is fastened a central member, B or B′, and cylinder D of the pump, and at the upper end of the cylinder is a center piece or bracket, E. The parts A, B, D, and E are screwed together or attached to each other in any substantial manner. Central member B B, &c., has any desired number of wings extending from its center, and each wing has, in its most perfect form, the cutting-edge of bit, beveled on one side similar to a carpenter's chisel, (shown in Figs. 1 and 2,) for the purpose of giving a drill or a pump-drill a slightly-rotating motion at each descending stroke or blow, causing each succeeding blow to strike in a new place, without the necessity of rotating the drill at the surface of the ground, as is now the method. The swivel-formed bracket E and rod F allow a drill or pump-drill to revolve, as described. The cutting-edges, beveled all on one side, or chiefly on one side, also facilitates the rapidity of cutting and chipping the rock to be drilled.

The bits or cutting-edges of wings B′ are beveled on both sides, and the drill or pump-drill requires to be rotated from the top of the well in the usual manner, and the swivel, as such, dispensed with, and the hole through bracket E, to receive rod F, made square, and the rod made square between shoulders G and K, for the purpose of rotating a drill or a pump-drill from the top of the well, and giving a double blow, as hereinafter described. Rod F of the swivel-bracket E and collar G constitute a means of giving a double blow at each descent of a drill and rod, or at each descent of a pump-drill and rod—first, by the weight of the drill or pump-drill, and, second, by the weight of the rod, which continues to descend until collar G comes in contact with shoulder H.

The force of the second blow depends on the greater distance from G to K than from H to J, which distance may be graduated by moving and fastening the collar G at any desired point on the rod.

On the upward motion the shoulder K, striking shoulder J, causes a concussion, useful in keeping the drill free from becoming fast in the bottom of the drilled hole.

The circular member A has holes near its bottom or cutting edge, which holes are angular, as at *c*, or horizontal, as at *d*, in Figs. 1 and 2, and are of any desired size and shape, and are for the purpose of allowing the water between the wall of drilled rock and outside of the pump-drill to enter the drilled hole to take the place of the pulverized rock, sand, and mud, and roily water received in the pump at the descending blow, and also prevents a tendency to form a vacuum below the drill-pump by the close fitting of the cutting and trimming edge of circular member A to the wall of the drilled hole as the pump-drill rises.

In Figs. 3 and 6, where the cutting-bits B′ are beveled on both sides, and the revolving of the pump-drill is done at the top of the well, are channels or grooves *i i i*, as in Fig. 3, made longitudinally with the outside line of the pump and drill, through the bit and cutting-edge of the member A, which expands outwardly, as shown, through which channels water finds its way under the drill as it rises.

The channels may be made of any size, shape, or number that will best accomplish the desired object, and not impair the efficiency of the drill.

A view of these channels is also seen at *i i i i* in the horizontal cross-section, Fig. 5, in which the greatest diameter of the cutting-edge of the member A is from *e* to *f*, and the greatest diameter of the pump-drill above the tapering portion of the bit is from *g* to *h*, these diameters being also shown by corresponding letters in Fig. 6.

Either holes or channels may be used through which to supply water from the space *n* between the pump-drill and drilled rock S, as shown in Figs. 2 and 3, to take the place of pulverized rock, sand, and other substances taken into the pump as the pump-drill is operated, whereby the drill has less obstruction in reaching the rock to be drilled, and a cleaner surface when reached, both of which are important advantages.

A ball-valve, C, in Fig. 1, I deem the best for a sand-pump combined with a drill, though any suitable kind of valve may be used.

To prevent chips of rock, sand, or other obstructing substance from ascending and clogging the valve, I use a screen or sieve, *j*, in Figs. 1 and 7, of any suitable material and texture. A coarse sieve of brass wire I deem suitable.

I do not confine myself to any particular angle or degree of expansion of the bit or lower end of circular member A of the pump-drill; that which will be effectual and durable, and yet allow it to rise and fall freely, will best serve the purpose.

When the water in the drilled hole comes sufficiently near the top of the well, pipe N, in Fig. 2, is used as a hollow pumping and drilling rod. I also use it to convey the contents of the pump-drill to or above the top of the well to be discharged. Thus the drilling and pumping is carried on at one and the same operation. Also, I use a pumping-rod and suitable valves inside the pipe N, at a proper distance below the surface of the water in the well, to make an auxiliary pump, when the interior diameter of the pipe N is suitable for that purpose. This auxiliary pump I operate by attaching the upper end of this pumping-rod firmly over the top of the pipe N to a stationary beam or other suitable fixture; and the process of pumping the contents out of the pipe N, as they ascend from the pump-drill, is accomplished as the pipe descends at each blow of the drill; or I operate this auxiliary pump independently by a lever or other suitable means, yet as an auxiliary to the pump-drill at the bottom of the drilled hole. This greatly aids the process of sinking a well by boring or drilling rock, but cannot be used unless there is a suitable abundance of water.

When the pump-drill is operated by means of rod F and rope R, in Fig. 3, and cylinder D, which may be of any suitable length and capacity, is filled with sand and pulverized rock, the pump-drill is withdrawn and the contents discharged, requiring much less time than when a sand-pump and drill are used separately.

In Figs. 2 and 3 is a spring-guide, in which O is a collar, rounded inside to allow a rod or pipe to pass freely, and has attached to it springs *s s s s s s s s*, curved substantially as shown, so that they will pass obstructions, and are sufficiently strong to sustain their own weight and that of the collar by a gentle pressure against the wall of the drilled rock, and serve to guide the rod or pipe and keep it central in the well, whereby greater efficiency is added to the drill, and the breaking of the corners or edges of the drill avoided, by keeping it perpendicular and in line.

Sockets or couplings Q, in Figs. 2 and 3, that connect joints of pipe N and joints of rod F, one above and one below the spring-guide, move the spring-guide up and down in the well, and as many as may be necessary to keep the pipes or rods in line should be used. Also, any suitable additional number of springs *s* may be added to each collar to form a receptacle, opening upward, to catch fragments of rock, tools, or other article that may fall into the well, and thus prevent their getting wedged in between the drill and wall of drilled rock, whereby loss of time or of a drill, or both, may be saved.

In Letters Patent granted to me on the 23d day of August, 1859, No. 25,208, for improvements in pumps, I show a spring-guide for keeping a pump-pipe in the center of a drilled well. I now apply and combine a spring-guide with a rock-drill, as herein described.

I am aware that a perforated drill-valve and flexible hose have been used in combination, and I do not claim such combination, nor any combination including a flexible pipe or hose.

What I claim as my invention, and desire to secure by Letters Patent, is—

1. The combination of the parts E, F, G, and K, forming the swivel, and arranged substantially as herein described, for giving a single or double blow to the drill.

2. The combination of the spring-guide O *s s* with the drill rod or pipe, as and for the purpose set forth.

3. The screen or strainer of wire-gauze, in combination with a pump drill or tube, substantially as and for the purpose specified.

4. The combination of a screen or strainer with a perforated or cutting guide-flange, A, as and for the purpose set forth.

5. The combination of a screen or strainer with a bit, B or B′, as and for the purpose specified.

JOHN M. MAY.

Witnesses:
SAML. KNIGHT,
ROBERT BURNS.